US011415980B2

(12) United States Patent
Morishita et al.

(10) Patent No.: US 11,415,980 B2
(45) Date of Patent: Aug. 16, 2022

(54) MOVING OBJECT OPERATION SYSTEM, OPERATION SIGNAL TRANSMISSION SYSTEM, MOVING OBJECT OPERATION METHOD, PROGRAM, AND RECORDING MEDIUM

(71) Applicant: NEC Solution Innovators, Ltd., Tokyo (JP)

(72) Inventors: Koji Morishita, Tokyo (JP); Hiroaki Yanagisawa, Tokyo (JP); Hisashi Noda, Tokyo (JP)

(73) Assignee: NEC Solution Innovators, Ltd., Tokyo (JP)

( * ) Notice: Subject to any disclaimer, the term of this patent is extended or adjusted under 35 U.S.C. 154(b) by 750 days.

(21) Appl. No.: 16/321,487

(22) PCT Filed: Jun. 8, 2017

(86) PCT No.: PCT/JP2017/021356
§ 371 (c)(1),
(2) Date: Jan. 29, 2019

(87) PCT Pub. No.: WO2018/020853
PCT Pub. Date: Feb. 1, 2018

(65) Prior Publication Data
US 2021/0318679 A1  Oct. 14, 2021

(30) Foreign Application Priority Data

Jul. 29, 2016 (JP) .............................. JP2016-150569

(51) Int. Cl.
*G06T 7/20* (2017.01)
*G05D 1/00* (2006.01)
(Continued)

(52) U.S. Cl.
CPC ......... *G05D 1/0016* (2013.01); *B64C 39/024* (2013.01); *G02B 27/017* (2013.01);
(Continued)

(58) Field of Classification Search
CPC .................................................... G05D 1/0016
See application file for complete search history.

(56) References Cited

U.S. PATENT DOCUMENTS 5,999,185 A * 12/1999 Kato ....................... G06F 3/011
345/420
6,128,018 A * 10/2000 Nakajima ............... G06T 17/00
345/419
(Continued)

FOREIGN PATENT DOCUMENTS

CN      103426282 A    12/2013
CN      104748730      7/2015
(Continued)

OTHER PUBLICATIONS

Chinese Office Action for CN Application No. 201780046911.X dated May 11, 2021 with English Translation.
(Continued)

*Primary Examiner* — Shelley Chen
(74) *Attorney, Agent, or Firm* — Sughrue Mion, PLLC

(57) ABSTRACT

The present invention provides a new system that allows an easier operation of a moving object. The present invention provides a moving object operation system (1) including a moving object (20) and an operation signal transmitter (10) for the moving object (20). The moving object (20) includes a signal receipt unit (201) that receives an operation signal from the operation signal transmitter (10). The operation signal transmitter (10) includes a storage unit (101) that contains conversion information, a motion information acquisition unit (102) that acquires motion information of an
(Continued)

(B) Move straight ahead (C2') Turn left slightly  (C) Turn left  (A) Stand still  (D1) Turn right  (D1') Turn right slightly (D2) Move left in parallel  (D1) Move right in parallel operator, a conversion unit (103) that converts the acquired motion information into the operation signal to the moving object (20) based on the conversion information, and a signal transmission unit (104) that transmits the operation signal to the moving object (20).

20 Claims, 11 Drawing Sheets

(51) Int. Cl.
   *B64C 39/02* (2006.01)
   *G02B 27/01* (2006.01)
   *G06F 3/01* (2006.01)

(52) U.S. Cl.
   CPC ........... *G05D 1/0038* (2013.01); *G06F 3/011* (2013.01); *G06T 7/20* (2013.01); *B64C 2201/146* (2013.01)

(56) References Cited

U.S. PATENT DOCUMENTS

| | | | |
|---|---|---|---|
| 6,431,982 B2* | 8/2002 | Kobayashi | A63F 13/5378 463/4 |
| 7,071,914 B1* | 7/2006 | Marks | G06F 3/005 345/156 |
| 9,052,710 B1* | 6/2015 | Farwell | B25J 9/1656 |
| 9,211,644 B1* | 12/2015 | Checka | G06F 3/017 |
| 9,870,716 B1* | 1/2018 | Rao | G09B 19/0092 |
| 10,216,177 B2* | 2/2019 | Gildert | G05B 19/42 |
| 10,514,687 B2* | 12/2019 | Brooks | B25J 9/0081 |
| 10,627,860 B2* | 4/2020 | Jacobsen | G05D 1/0016 |
| 10,745,132 B1* | 8/2020 | Kimchi | G05D 1/0016 |
| 10,768,708 B1* | 9/2020 | Sills | B25J 13/00 |
| 2009/0222149 A1 | 9/2009 | Murray et al. | |
| 2010/0235034 A1* | 9/2010 | Higgins | G06K 9/00355 701/28 |
| 2011/0124385 A1* | 5/2011 | Otomo | A63F 13/56 463/3 |
| 2011/0274358 A1 | 11/2011 | Higgins | |
| 2011/0288696 A1 | 11/2011 | Lefebure | |
| 2012/0127176 A1* | 5/2012 | Margolis | A63F 13/428 345/420 |
| 2012/0287284 A1* | 11/2012 | Jacobsen | G06F 3/012 345/419 |
| 2013/0176302 A1* | 7/2013 | Jeong | A63F 13/42 345/419 |
| 2013/0293362 A1 | 11/2013 | Parazynski | |
| 2013/0300649 A1 | 11/2013 | Parkinson et al. | |
| 2014/0379178 A1 | 12/2014 | Goossen et al. | |
| 2015/0261217 A1* | 9/2015 | Gil | G05D 1/0022 701/2 |
| 2016/0077608 A1 | 3/2016 | Nakasu et al. | |
| 2016/0232793 A1 | 8/2016 | Morishita et al. | |
| 2016/0292905 A1* | 10/2016 | Nehmadi | G06V 20/58 |
| 2016/0349835 A1* | 12/2016 | Shapira | G06F 3/016 |
| 2018/0072226 A1* | 3/2018 | Bunch | B60K 35/00 |
| 2018/0210979 A1* | 7/2018 | Jeong | G06F 30/00 |
| 2018/0259980 A1 | 9/2018 | Cuban et al. | |
| 2019/0023392 A1* | 1/2019 | Micros | B64C 33/025 |
| 2020/0241575 A1 | 7/2020 | Meisenholder et al. | |
| 2021/0286352 A1* | 9/2021 | Yanagisawa | G05D 1/0016 |

FOREIGN PATENT DOCUMENTS

| | | | | |
|---|---|---|---|---|
| CN | 105222761 A | | 1/2016 | |
| CN | 105223959 A | * | 1/2016 | |
| CN | 105739525 | | 7/2016 | |
| CN | 105759833 A | | 7/2016 | |
| CN | 106020492 A | * | 10/2016 | |
| DE | 69635710 T2 | * | 8/2006 | ......... G06F 3/04815 |
| EP | 2712432 | | 4/2014 | |
| GN | 103620527 A | | 3/2014 | |
| JP | 6-152440 A | | 5/1994 | |
| JP | 8-9224 A | | 1/1996 | |
| JP | 2001269885 A | * | 10/2001 | ............. B25J 13/02 |
| JP | 2007-188309 A | | 7/2007 | |
| JP | 2010-158350 A | | 7/2010 | |
| JP | 2010-262477 A | | 11/2010 | |
| JP | 2012-509812 A | | 4/2012 | |
| JP | 2015-006875 A | | 1/2015 | |
| JP | 2015-504616 A | | 2/2015 | |
| JP | 2016-062274 A | | 4/2016 | |
| WO | 2012/154938 A1 | | 11/2012 | |
| WO | WO-2013105443 A1 | * | 7/2013 | .......... G06F 3/0486 |
| WO | 2014/107219 A1 | | 7/2014 | |
| WO | 2015/014116 A1 | | 2/2015 | |
| WO | 2015/040893 A1 | | 3/2015 | |

OTHER PUBLICATIONS

Japanese Office Action for JP Application No. 2020-071621 dated Jan. 26, 2021 with English Translation,.
Extended European Search Report for EP Application No. EP17833863.8 dated Jan. 2, 2020.
Japanese Office Action for JP Application No. 2018-529413 dated Jan. 21, 2020 with English Translation.
Rudnick et al., "Scalable Autonomy Concept for Reconnaissance UAVs on the Basis of an HTN Agent Architecture", 2016 International Conference on Unmanned Aircraft Systems (ICUAS), Jun. 7-10, 2016. (p. 40-46).
International Search Report of PCT/JP2017/021356 dated Aug. 29, 2017.
U.S. Office Action for U.S. Appl. No. 16/321,492 dated Sep. 3, 2021.

* cited by examiner (B) Move straight ahead (C2') Turn left slightly  (C) Turn left  (A) Stand still  (C1) Turn right  (C1') Turn right slightly (D2) Move left in parallel  (D1) Move right in parallel

MOVING OBJECT OPERATION SYSTEM, OPERATION SIGNAL TRANSMISSION SYSTEM, MOVING OBJECT OPERATION METHOD, PROGRAM, AND RECORDING MEDIUM

This application is a National Stage Entry of PCT/JP2017/021356 filed on Jun. 8, 2017, which claims priority from Japanese Patent Application 2016-150569 filed on Jul. 29, 2016, the contents of all of which are incorporated herein by reference, in their entirety.

TECHNICAL FIELD

The present invention relates to a moving object operation system, an operation signal transmission system, a moving object operation method, a program, and a recording medium.

BACKGROUND ART

Among unmanned flight vehicles operated by remote control, drones have been attempted to be used for various services in recent years. In addition, drones have become easy to obtain as household toys. A so-called proportional type controller is used for the operation of the drone, and the motor of the drone is controlled by moving two sticks mounted on the controller, thereby controlling the movement of the drone (Non Patent Literature 1). However, the operation of the drone is extremely difficult. In fact, sufficient practice must be carried out in order to safely operate the drone.

CITATION LIST

Non-Patent Literature

Non Patent Literature 1: "Scalable Autonomy Concept for Reconnaissance UAVs on the Basis of an HTN Agent Architecture", 2016 International Conference on Unmanned Aircraft Systems (ICUAS), Jun. 7-10, 2016.

SUMMARY OF INVENTION

Technical Problem

Hence, the present invention is intended to provide a new system that allows an easier operation of an unmanned flight vehicle such as a drone operated by remote control.

Solution to Problem

In order to achieve the above object, the present invention provides a moving object operation system including: a moving object; and an operation signal transmitter for the moving object. The moving object includes a signal receipt unit that receives an operation signal from the operation signal transmitter. The operation signal transmitter includes a storage unit that contains conversion information; a motion information acquisition unit that acquires motion information of an operator; a conversion unit that converts the acquired motion information into the operation signal to the moving object based on the conversion information; and a signal transmission unit that transmits the operation signal to the moving object. The conversion information includes human motion information and operation signal information for instructing the moving object in how to move, and the human motion information and the operation signal information are associated with each other. The human motion information is motion information imagining movement of the moving object.

The present invention also provides an operation signal transmission system for a moving object, including: a storage unit that contains conversion information; a motion information acquisition unit that acquires motion information of an operator; a conversion unit that converts the acquired motion information into an operation signal to a moving object based on the conversion information; and a signal transmission unit that transmits the operation signal to the moving object. The conversion information includes human motion information, moving object movement information, and operation signal information for instructing the moving object in how to move, and the human motion information, the moving object movement information, and the operation signal information are associated with one another. The human motion information is motion information imagining movement of the moving object.

The present invention also provides a moving object operation method using a moving object and the operation signal transmission system of the present invention, including the steps of: acquiring motion information of an operator by the system; converting the acquired motion information into the operation signal to the moving object based on the conversion information by the system; transmitting the operation signal to the moving object by the system; and receiving the transmitted operation signal by the moving object. The conversion information includes human motion information and operation signal information for instructing the moving object in how to move, and the human motion information and the operation signal information are associated with each other. The human motion information is motion information imagining movement of the moving object.

The present invention also provides a program that can execute the moving object operation method of the present invention on a computer.

The present invention also provides a computer-readable recording medium recorded with the program of the present invention.

Advantageous Effects of Invention

According to the present invention, an easier operation of a moving object can be achieved.

DESCRIPTION OF EMBODIMENTS

Figure 1:
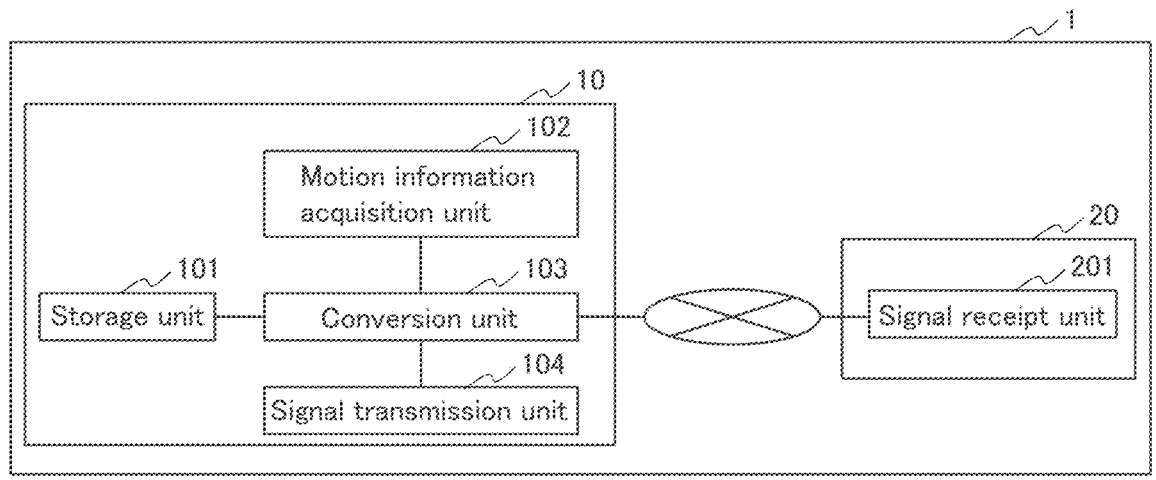
FIG. 1 is a block diagram showing an example of the moving object operation system according to the first example embodiment of the present invention.

In the moving object operation system of the present invention, for example, the human motion information is motion information for reproducing the movement of the moving object with a human body.

In the moving object operation system of the present invention, for example, the moving object is a flight vehicle.

In the moving object operation system of the present invention, for example, the flight vehicle is a drone or a radio control vehicle.

In the moving object operation system of the present invention, for example, the human motion information includes a type of motion and a degree of motion, the moving object movement information includes a type of movement and a degree of movement, and the operation signal information includes a type of movement to be instructed and a degree of movement to be instructed.

In the moving object operation system of the present invention, for example, the operation signal transmitter further includes: a sound information acquisition unit that acquires human sound (voice) information. The conversion unit converts the acquired sound information into the operation signal to the moving object based on the conversion information. The conversion information further includes human sound information, and the sound information and the operation signal information are associated with each other.

In the moving object operation system of the present invention, for example, the moving object further includes: an image information acquisition unit that acquires image information; and an image information transmission unit that transmits the acquired image information to the operation signal transmitter, and the operation signal transmitter further includes: an image information receipt unit that receives the image information transmitted from the moving object; and a display unit that displays the image information.

In the moving object operation system of the present invention, for example, the image information acquisition unit of the moving object is a camera.

In the moving object operation system of the present invention, for example, the display unit of the operation signal transmitter is a human wearable display.

In the moving object operation system of the present invention, for example, the operation signal transmitter further includes: a position prediction unit that predicts a position of the moving object after a predetermined period of time based on the image information received by the image information receipt unit, and the display unit displays the image information received by the image information receipt unit and the predicted position information obtained by the position prediction unit.

In the operation signal transmission system of the present invention, for example, the human motion information is motion information for reproducing the movement of the moving object with a human body.

In the operation signal transmission system of the present invention, for example, the moving object is a flight vehicle.

In the operation signal transmission system of the present invention, for example, the flight vehicle is a drone.

In the operation signal transmission system of the present invention, for example, the human motion information includes a type of motion and a degree of motion, the moving object movement information includes a type of movement and a degree of movement, and the operation signal information includes a type of movement to be instructed and a degree of movement to be instructed.

The operation signal transmission system of the present invention further includes a sound information acquisition unit that acquires human sound information, for example. The conversion unit converts the acquired sound information into the operation signal to the moving object based on the conversion information. The conversion information further includes human sound information, and the sound information and the operation signal information are associated with each other.

The operation signal transmission system of the present invention further includes an image information receipt unit that receives the image information transmitted from the moving object; and a display unit that displays the image information, for example.

In the operation signal transmission system of the present invention, for example, the display unit is a human wearable display.

The operation signal transmission system of the present invention includes an information acquisition terminal; and a server, for example. The terminal and the server are connectable via a communication network. The terminal includes: the motion information acquisition unit. The server includes: the storage unit; the conversion unit; and the signal transmission unit.

In the operation signal transmission system of the present invention, for example, the information acquisition terminal further includes the sound information acquisition unit.

The operation signal transmission system of the present invention further includes a position prediction unit that predicts a position of the moving object after a predetermined period of time based on the image information received by the image information receipt unit. The display unit displays the image information received by the image information receipt unit and the predicted position information obtained by the position prediction unit.

The operation signal transmission system further includes a display terminal, for example. The display terminal includes: the image information receipt unit; and the display unit.

In the moving object operation method of the present invention, for example, the human motion information is motion information for reproducing the movement of the moving object with a human body.

In the moving object operation method of the present invention, for example, the moving object is a flight vehicle.

In the moving object operation method of the present invention, for example, the flight vehicle is a drone.

In the moving object operation method of the present invention, for example, the human motion information includes a type of motion and a degree of motion, the moving object movement information includes a type of movement and a degree of movement, and the operation signal information includes a type of movement to be instructed and a degree of movement to be instructed.

The moving object operation method of the present invention further includes the step of: acquiring human sound information by the system, for example. The acquired sound information is converted into the operation signal to the moving object based on the conversion information in the conversion step. The conversion information further includes human sound information, and the sound information and the operation signal information are associated with each other.

The moving object operation method of the present invention further includes the steps of: acquiring image information by the moving object; transmitting the acquired image information to the system by the moving object; receiving the image information transmitted from the moving object by the system; and displaying the image information by the system.

In the moving object operation method of the present invention, for example, image information is acquired by a camera in the image information acquisition step.

In the moving object operation method of the present invention, for example, the image information is displayed on a human wearable display in the display step.

The moving object operation method of the present invention further includes the step of: predicting a position of the moving object after a predetermined period of time based on the image information received in the image information receipt step by the system, for example. The image information received in the image information receipt step and the predicted position information obtained in the position prediction step are displayed in the display step.

The example embodiments of the present invention are described below with reference to the drawings. It is to be noted, however, that the present invention is by no means limited or restricted by the following example embodiments. In the following drawings, identical parts are indicated with identical reference signs. Regarding the descriptions of the example embodiments, reference can be made to one another unless otherwise stated. Furthermore, the configurations of the example embodiments can be combined unless otherwise stated.

First Example Embodiment

The first example embodiment relates to a moving object operation system, an operation signal transmission system, and a moving object operation method of the present invention.

FIG. 1 shows a block diagram of a moving object operation system according to the present example embodiment. As shown in FIG. 1, a moving object operation system 1 of the present example embodiment includes an operation signal transmitter 10 and a moving object 20. The operation signal transmitter 10 and the moving object 20 are connectable via a communication network.

The moving object 20 is, for example, an unmanned flight vehicle operated by remote control, and may be a flight vehicle. The flight vehicle may be, for example, an unmanned flight vehicle with a rotary wing such as a helicopter. The helicopter may be, for example, a multicopter such as a quad copter. Specifically, the multicopter such as a quad copter or the like may be, for example, a so-called drone. Examples of the flight vehicle besides the drone include radio operated flight vehicles such as a balloon, an airship, a variable-wing aircraft (VTOL), a fixed-wing aircraft, and a multiple-wing aircraft (e.g., an Amazon Air). The moving object may be, for example, a remote vehicle such as a throttle-automobile.

The operation signal transmitter 10 includes a storage unit 101, a motion information acquisition unit 102, a conversion unit 103, and a signal transmission unit 104. The conversion unit 103 and the signal transmission unit 104 may be installed, for example, in a data processing unit (data processing device), which is hardware or may be software or hardware in which the software is installed. The data processing unit may include a central processing unit (CPU) or the like. The moving object 20 includes a signal receipt unit 201. In the moving object operation system 1 of the present example embodiment, the storage unit 101 and the motion information acquisition unit 102 are electrically connected to the conversion unit 103, and the conversion unit 103 is electrically connected to the signal transmission unit 104. In the moving object operation system 1 of the present example embodiment, for example, any one or more units may be separated.

In the moving object operation system 1, the operation signal transmitter 10 may be, for example, an apparatus that includes the storage unit 101, the motion information acquisition unit 102, the conversion unit 103, and the signal transmission unit 104 as one piece, or may be a system. An example of the latter case is shown in FIG. 2.

Figure 2:
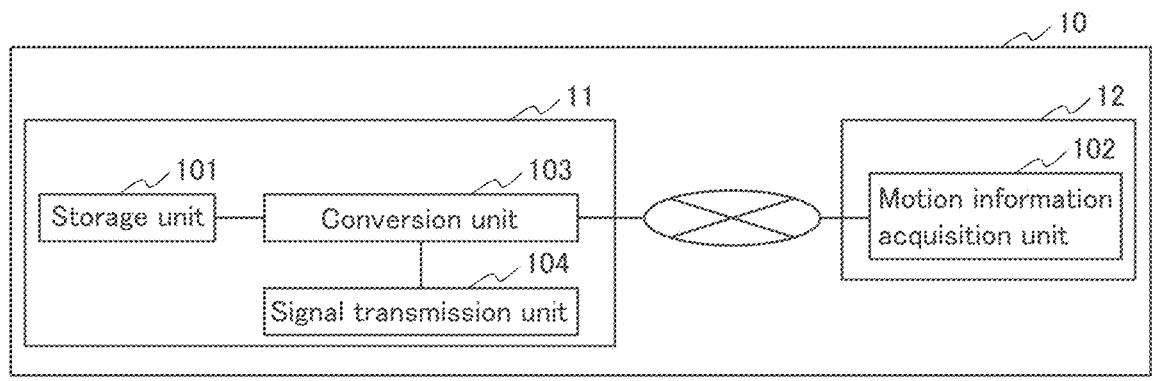
FIG. 2 is a block diagram showing an example of the operation signal transmission system according to the first example embodiment of the present invention.

FIG. 2 is a block diagram of the system showing an example in which the operation signal transmitter 10 is an operation signal transmission system. As shown in FIG. 2, the operation signal transmission system 10 includes a main body 11 and a terminal 12. The main body 11 and the terminal 12 are connectable via a wired or wireless communication network. The main body 11 includes the storage unit 101, the conversion unit 103, and the signal transmission unit 104. In the main body 11, the storage unit 101 is electrically connected to the conversion unit 103, and the conversion unit 103 is electrically connected to the signal transmission unit 104. The terminal 12 is an information acquisition unit and includes an operation information acquisition unit 102.

The storage unit 101 contains conversion information. Examples of the storage unit 101 include random access memories (RAMs), read only memories (ROMs), flash memories, hard disks (HDs), optical disks, and Floppy® disks (FDs). The storage unit 101 may be a built-in type or an external type such as an external storage device.

The motion information acquisition unit 102 acquires motion information of an operator. The motion information acquisition unit 102 is, for example, a terminal 12 as described above, and specific examples thereof include motion capture sensors such as KINECT® produced by Microsoft Corporation and Perception Neuron produced by Noitom Ltd. The type of the motion information obtained by the motion information acquisition unit 102 is not particularly limited, and examples thereof include motion images such as two-dimensional or three-dimensional images, two-dimensional or three-dimensional motion sensor data acquired by the sensor or the like, and motion analysis data analyzed by a motion analysis table or the like.

The conversion information includes human motion information and operation signal information for instructing the moving object in how to move, and the human motion information and the operation signal information are associated with each other. The human motion information is motion information imagining movement of the moving object, and is, for example, motion information for reproducing the movement of the moving object with a human body. The human motion information includes, for example, the type of motion, and the moving object movement information includes, for example, the type of movement.

The conversion information is described below with reference to a case in which the moving object is a flight vehicle such as a drone or the like as a specific example. The drone is operated by controlling the motor of each propeller by two sticks of the controller as described above. The movement (throttle, pitch, roll, ladder, or the like) of the motor controls the movement of the drone such as front to back and side to side traveling, swivel, stop, or the like. That is, the motion of the operator in the conventional drone operation is the motion of the fingers operating the controller. On the other hand, although a human cannot fly using his or her body, people have a common potential image of motion (e.g., body posture, pose, and the like) of flying using the body, which is based on movies, picture books, comics, animations, and the like, for example. Thus, for example, each motion of flying potentially imagined by a person can be associated with each of the movements of the drone. Hence, in the present invention, an imagined human motion information and an operation signal for instructing a movement corresponding thereto to the drone are associated with each other, thereby obtaining conversion information. This allows an operator to operate a drone more easily than the operation with a controller because the motion is converted into the associated operation signal information by taking the motion what he or she imagines. Especially, in the case of a conventional controller, for example, delicate movements of the two sticks and the combinations of the movements must be memorized, which makes an operation extremely difficult. In contrast, movements potentially imagined by a person are easy for an operator to memorize, and the body tends to react naturally even when quick judgments need to be made, thereby achieving an easier operation.

Regarding the conversion information, the combination of the human motion information and the movement of the moving object associated therewith is not particularly limited, and can be appropriately set according to the attribute of the operator, for example. Examples of the attribute include a child, an adult, a woman, a man, a beginner, and an experienced individual. The conversion information can be obtained, for example, by systematizing the movement of the moving object and the motion image common in the predetermined attributes. As a specific example, when the attribute is a child, for example, the conversion information for each movement of the moving object can be set by collecting potential motion images of a plurality of children, selecting common motion images, and systematizing each movement of the moving object and a motion image corresponding thereto.

Figure 3:
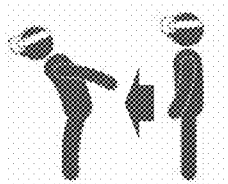
FIG. 3 is a schematic view showing an example of human motion information in the first example embodiment of the present invention.
Figure 3:
Figure 3:
Figure 3:
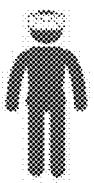
Figure 3:
Figure 3:
Figure 3:
Figure 3:

FIG. 3 shows the relationship between the human motion information and the movement of a moving object associated therewith. FIG. 3 is merely for illustrative proposes and does not limit the present invention. As shown in FIG. 3, the body posture (A) is an upright posture facing the front (in the direction perpendicular to the drawing plane), the body posture (A) corresponds to the state in which the moving object is stand still, the body posture (B) is a posture of tilting the upper body forward, which corresponds to the state in which the moving object moves straight ahead (corresponding to the flight in the case of a flight vehicle), the body posture (C1) is a posture of twisting the body to the right, which corresponds to the state in which the moving object turns right, the body posture (C2) is a posture of twisting the body to the left, which corresponds to the state in which the moving object turns left, the body posture of twisting the body slightly to the right corresponds to the state in which the moving object turns right slightly, the body posture of twisting the body slightly to the left corresponds to the state in which the moving object turns left slightly, the body posture of bending the right arm corresponds to the state in which the moving object moves right in parallel, and the body posture of bending the left arm corresponds to the state in which the moving object moves left in parallel. For example, with an image in which a thruster or an aileron is on the palm, the body posture (D1) is a posture of bending one hand, which corresponds to the state in which the moving object moves right in parallel, and the body posture (D2) is a posture of bending the other hand, which corresponds to the state in which the moving object moves left in parallel. Furthermore, although it is not shown, the upright posture facing upward with palms down may correspond to the state in which the moving object takes off.

Preferably, the human motion information further includes the degree of motion in addition to the type of motion, for example, the moving object movement information further includes the degree of movement in addition to the type of movement, for example, and the operation signal information includes the type of movement to be instructed and the degree of movement to be instructed. That is, it is preferable to associate the weight of the degree of human motion with the weight of the degree of moving object movement by weighting the degree of human motion. This allows control of not only the type of movement but also the magnitude, speed, and the like of the movement, for example. As a specific example, as shown in FIG. 3, in the case of turning the moving object right, the degree of the turn of the moving object can be reduced by setting the motion (C1) to a smaller motion (C1'), and in the case of turning the moving object left, the degree of turn of the moving object can be reduced by setting the motion (C2) to a smaller motion (C2').

The conversion unit 103 converts the acquired motion information into the operation signal to the moving object based on the conversion information. The conversion unit 103 may be, for example, the CPU or the like.

The signal transmission unit 104 transmits the operation signal to the moving object. The signal transmission unit 104 may be, for example, the CPU or the like.

The moving object 20 includes the signal receipt unit 201 and the signal receipt unit 201 receives an operation signal from the operation signal transmitter 10. The signal receipt unit 201 may be, for example, the CPU.

The moving object 20 is not particularly limited, and is the same as described above. The moving object 20 may be, for example, a flight vehicle such as a drone.

Figure 4:
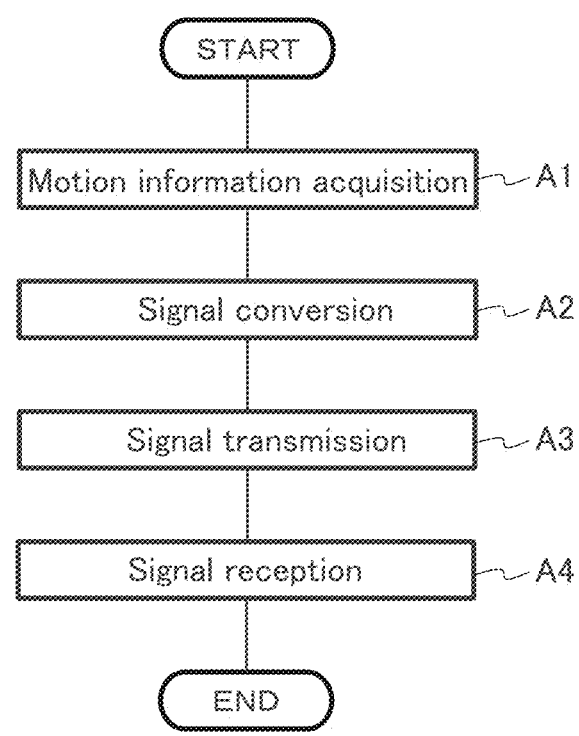
FIG. 4 is a flowchart showing an example of the moving object operation method according to the first example embodiment of the present invention.

FIG. 4 shows a flowchart of the moving object operation method according to the present example embodiment. The moving object operation method of the present example embodiment is performed as follows, for example, using the moving object operation system of FIG. 1. As shown in FIG.

4, the moving object operation method of the present example embodiment includes a step A1 (motion information acquisition), a step A2 (signal conversion), a step A3 (signal transmission), and a step A4 (signal reception).

First, the conversion information is prepared prior to the step A1. As the conversion information, for example, conversion information corresponding to the attribute of the operator can be selected as described above.

(A1) Motion Information Acquisition

In the step A1, the motion information of the operator is acquired by detecting the motion of the operator.

(A2) Signal Conversion

In the step A2, the motion information is converted into the operation signal to the moving object based on the conversion information.

(A3) Signal Transmission

In the step A3, the converted operation signal is transmitted from the operation signal transmitter 10 to the moving object 20.

(A4) Signal Reception

In the step A4, the moving object 20 receives the operation signal from the operation signal transmitter 10. Then, the movement of the moving object 20 is controlled according to the operation signal.

In the moving object operation system, the operation signal transmission system, and the moving object operation method according to the present example embodiment, the human motion information imagining the movement of the moving object is converted into the operation signal to the moving object to operate the moving object. This allows an easier operation. The same effects as these can be obtained also in the example embodiments described below.

Second Example Embodiment

The second example embodiment relates to an aspect in which the moving object operation system of the present invention further includes a sound information acquisition unit and a sound information acquisition step. Regarding the present example embodiment, reference can be made to the description of the first example embodiment.

Figure 5:
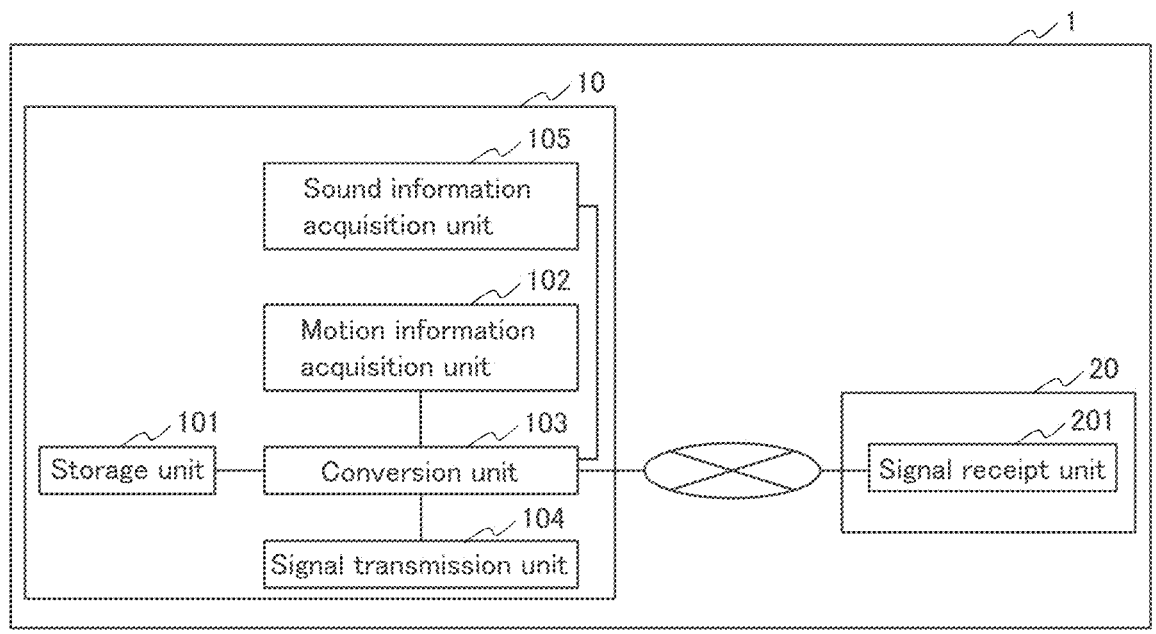
FIG. 5 is a block diagram showing an example of the moving object operation system according to the second example embodiment of the present invention.

FIG. 5 is a block diagram showing the moving object operation system according to the present example embodiment. As shown in FIG. 5, in the moving object operation system 1 of the present example embodiment, the operation signal transmitter 10 further includes a sound information acquisition unit 105.

Figure 6:
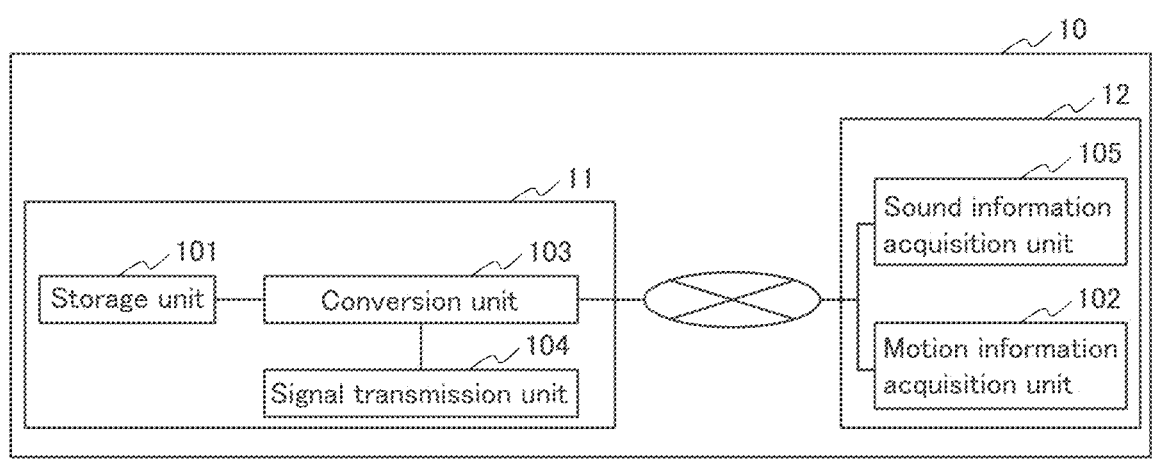
FIG. 6 is a block diagram showing an example of the operation signal transmission system according to the second example embodiment of the present invention.

The operation signal transmitter 10 may be an operation signal transmission system as described above. FIG. 6 shows a block diagram of the system. As shown in FIG. 6, the operation signal transmission system 10 includes the main body 11 and the terminal 12, and the main body 11 and the terminal 12 are connectable via a wired or wireless communication network. The main body 11 includes the storage unit 101, the conversion unit 103, and the signal transmission unit 104. In the main body 11, the storage unit 101 is electrically connected to the conversion unit 103, and the conversion unit 103 is electrically connected to the signal transmission unit 104. The terminal 12 is an information acquisition terminal, and includes the operation information acquisition unit 102 and the sound information acquisition unit 105. The operation signal transmission system 10 may include, for example, two terminals. One terminal includes the operating information acquisition unit 102, the other terminal includes the sound information acquisition unit 105, and each are connectable to the main body 11 via the communication network.

The sound information acquisition unit 105 acquires sound information of an operator. The sound information acquisition unit 105 is, for example, the terminal 12 as described above. As a specific example, the sound information acquisition unit 105 may be a sound recognizing device such as a microphone or the like. The type of the sound information obtained by the sound information acquisition unit 105 is not particularly limited, and examples thereof include sound data and sound analysis data analyzed by a sound analysis table or the like.

The conversion information of the storage unit 101 further includes human sound information, and the sound information and the operation signal information are associated with each other. Examples of the sound information include sound information denoting the type of motion and sound information indicating the degree of motion. The former sound information denoting the type of motion includes, for example, "watch out", "stop", and the like, which instruct the moving object to stop. The latter sound information indicating the degree of motion includes, for example, "less", "more", and the like, which instruct the moving object the degree of the movement; and "faster", "slower", and the like, which instruct the moving object the speed of the movement.

Figure 7:
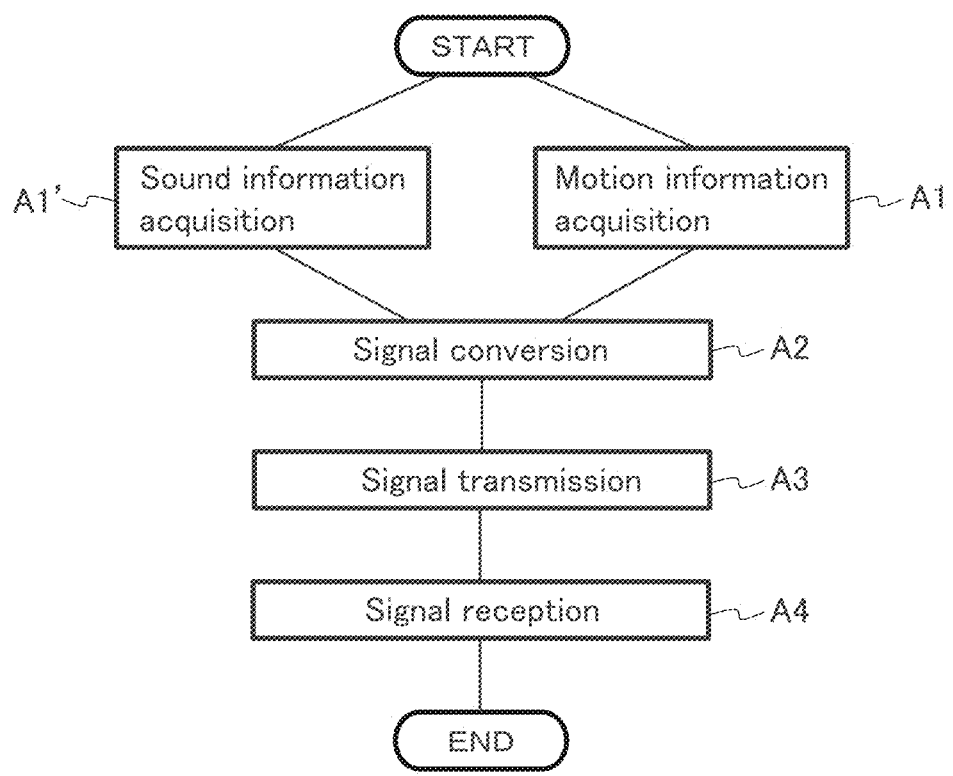
FIG. 7 is a flowchart showing an example of the moving object operation method according to the second example embodiment of the present invention.

Next, FIG. 7 shows a flowchart of the moving object operation method according to the present example embodiment. The moving object operation method of the present example embodiment is performed as follows using, for example, the moving object operation system of FIG. 5. As shown in FIG. 7, the moving object operation method of the present example embodiment includes the step A1 (motion information acquisition), a step A1' (sound information acquisition), the step A2 (signal conversion), the step A3 (signal transmission), and the step A4 (signal reception).

First, the conversion information is prepared prior to the step A1. As the conversion information, for example, conversion information corresponding to the attribute of the operator can be selected as described above.

(A1) Motion Information Acquisition

In the step A1, the motion information of the operator is acquired by detecting the motion of the operator.

(A1') Sound Information Acquisition

In the step A1', the sound information of the operator is acquired by detecting the sound (voice) of the operator in parallel with the step A1.

(A2) Signal Conversion

In the step A2, the motion information and the sound information are converted into an operation signal to the moving object based on the conversion information.

(A3) Signal Transmission

In the step A3, the converted operation signal is transmitted from the operation signal transmitter 10 to the moving object 20.

(A4) Signal Reception

In the step A4, the moving object 20 receives the operation signal from the operation signal transmitter 10. Then, the movement of the moving object 20 is controlled according to the operation signal.

In the moving object operation system, the operation signal transmission system, and the moving object operation method according to the present example embodiment, the sound information of the operator is converted into the operation signal to the moving object to operate the moving object. This allows a finer movement instruction, a prompt movement instruction, and the like. The same effects as these can be obtained also in the example embodiments described below.

Third Example Embodiment

The third example embodiment relates to an aspect in which the moving object operation system of the present invention further includes an image information receipt unit and a display unit, and an image information receipt step and a display step. Regarding the present example embodiment, reference can be made to the descriptions of the first and second example embodiments.

Figure 8:
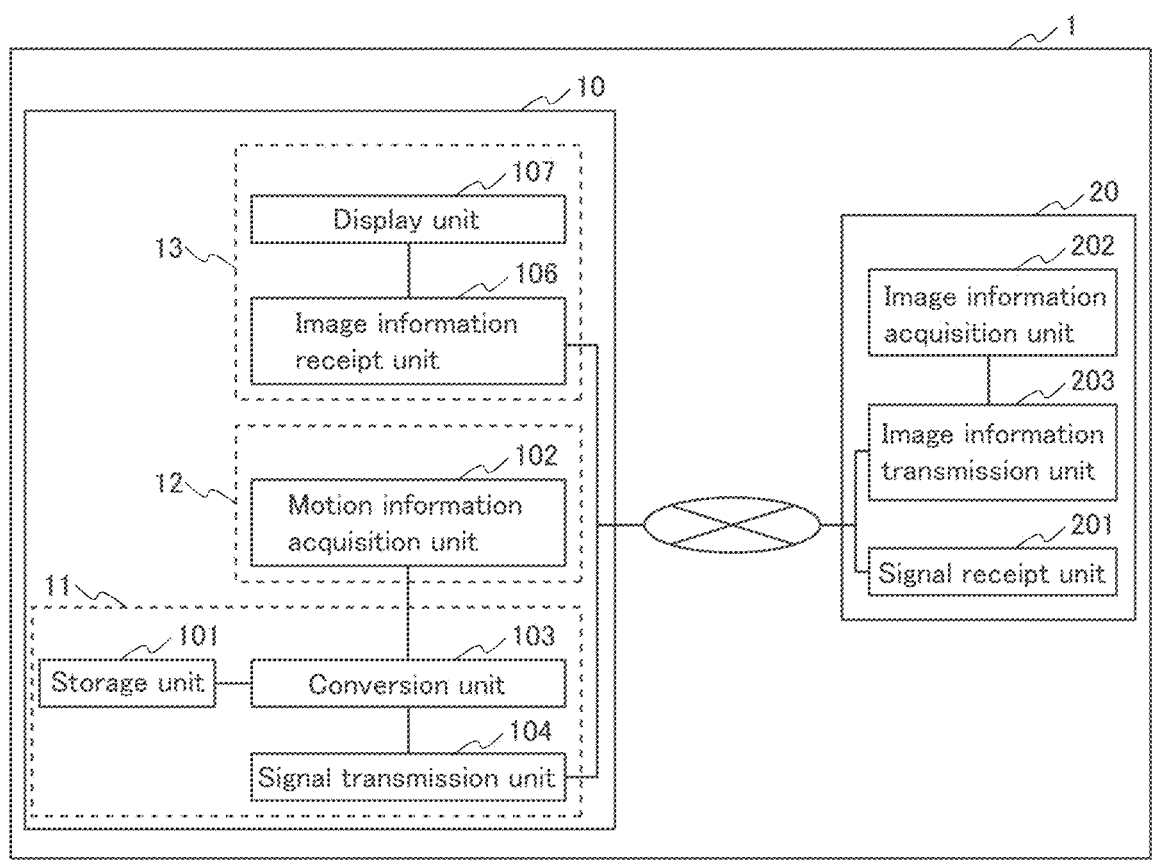
FIG. 8 is a block diagram showing an example of the moving object operation system according to the third example embodiment of the present invention.

FIG. 8 shows a block diagram of the moving object operation system according to the present example embodiment. As shown in FIG. 8, in the moving object operation system 1 of the present example embodiment, the operation signal transmitter 10 further includes an image information receipt unit 106 and a display unit 107, and the moving object 20 further includes an image information acquisition unit 202 and an image information transmission unit 203.

The image information acquisition unit 202 acquires image information. The image information is, for example, a moving image (video). The image information acquisition unit 202 may be, for example, a camera, and is mounted on the main body of the moving object 20. The camera may be, for example, a camera for shooting one direction. The camera may be, for example, a camera for shooting one direction, which may be rotatable by 360°. The camera is mounted on the moving object 20 in the state of shooting the front direction, for example. Alternatively, the camera may be, for example, a 360° camera for shooting an omnidirectional image at once. In the case of a 360° camera, for example, an omnidirectional image can be acquired without rotating the camera.

The image information transmission unit 203 transmits the image information acquired by the image information acquisition unit 202 to the operation signal transmitter 10. The image information transmission unit 203 may be a CPU or the like.

The operation signal transmitter 10 may be an operation signal transmission system, as described above. The operation signal transmission system 10 includes the main body 11 and two terminals 12 and 13, and the main body 11 and one terminal 12 are connectable via a wired or wireless communication network. The main body 11 includes the storage unit 101, the conversion unit 103, and the signal transmission unit 104. One terminal 12 is an information acquisition terminal, which includes the operation information acquisition unit 102, and the other terminal 13 is a display terminal, which includes the image information receipt unit 106 and the display unit 107. In the operation signal transmission system 10, the terminal 12 may be connectable to the main body 11 via the communication network.

The image information receipt unit 106 receives the image information transmitted from the moving object 20. The image information receipt unit 106 may be, for example, a CPU or the like.

The display unit 107 displays the received image information. The display unit 107 may be, for example, a monitor for outputting images, and specific examples thereof include various image display apparatuses such as liquid crystal displays (LCDs), cathode ray tube (CRT) displays, and the like. The terminal 13 including the display unit 107 may be, for example, a human wearable display. Specifically, the terminal 13 including the display unit 107 may be, for example, a head mounted display or the like. When the display unit 107 is the wearable display, for example, the display unit 107 may also serve as the motion information acquisition unit 102.

Figure 9:
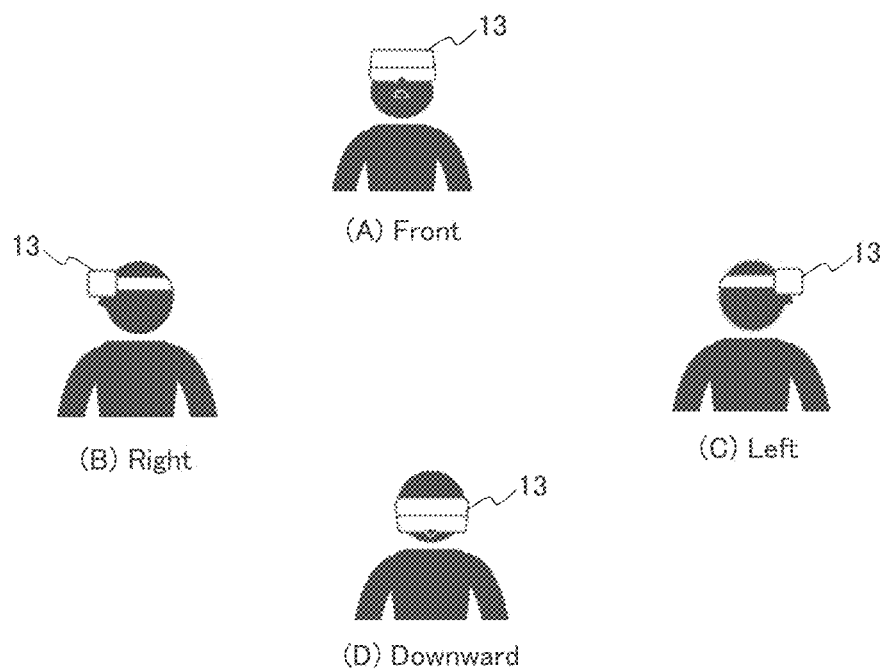
FIG. 9 is a schematic view showing an example of human motion information in the third example embodiment of the present invention.

When the display unit 107 is the wearable display and the image information acquisition unit 202 is a camera for shooting one direction, it is preferable that, for example, the moving direction of the moving object is identical to the direction of the image displayed on the display unit 107. When the display unit 107 also serves as the motion information acquisition unit 102, for example, the movement of the display unit 107 by the operator and the orientation of the camera in the moving object 20 can be interlocked with each other. FIG. 9 shows the relationship between the human motion information and the movement of a camera of the moving object 20 associated therewith. FIG. 9 is merely for illustrative purposes and does not limit the present invention. As shown in FIG. 9, when the operator wearing the terminal 13 including the display 107 faces front (A), the shooting direction of the camera of the moving object 20 is the front direction, when the operator faces right (B), the shooting direction of the camera of the moving object 20 is the right direction, when the operator faces left (C), the shooting direction of the camera of the moving object 20 is the left direction, and when the operator faces down (D), the shooting direction of the camera of the moving object 20 is the downward direction.

Figure 10:
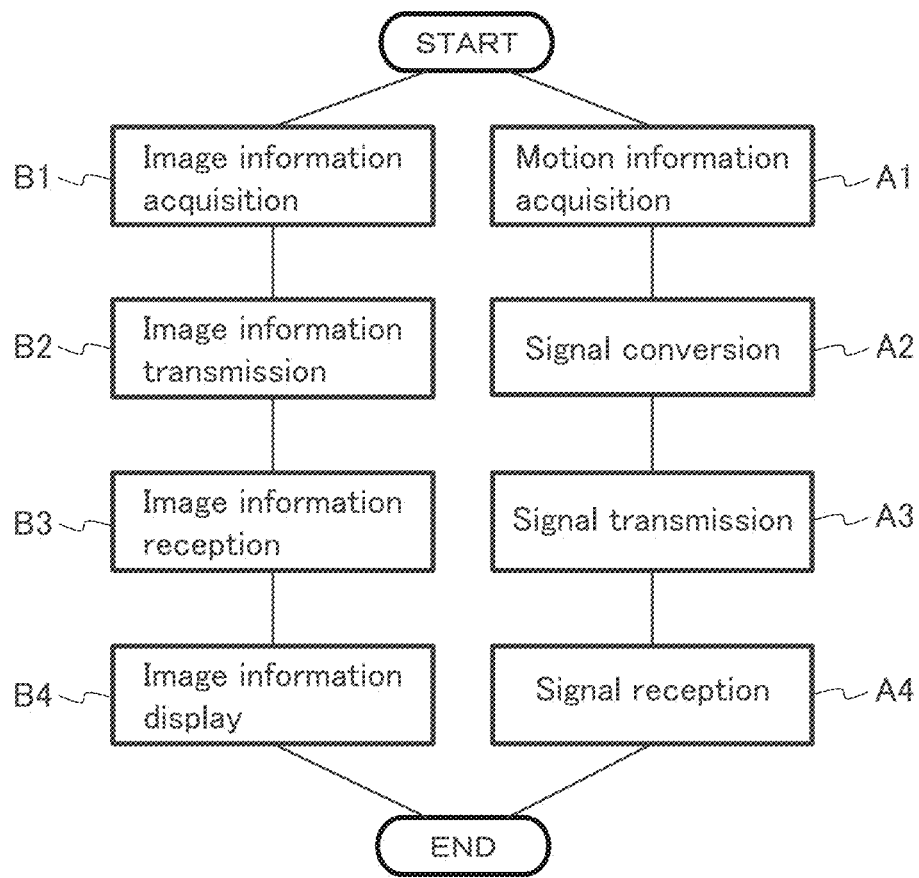
FIG. 10 is a flowchart showing an example of the moving object operation method according to the third example embodiment of the present invention.

FIG. 10 shows a flowchart of the moving object operation method according to the present example embodiment. The moving object operation method of the present example embodiment is performed as follows using, for example, the moving object operation system of FIG. 8. As shown in FIG. 10, the moving object operation method of the present example embodiment includes the step A1 (motion information acquisition), the step A2 (signal conversion), the step A3 (signal transmission), the A4 (signal reception), a step B1 (image information acquisition), a step B2 (image information transmission), a step B3 (image information reception), and a step B4 (image information display).

In the flowchart, the steps A1 to A4 are the same as in the example embodiments described above, and the steps B1 to B4 are performed in parallel with the steps A1 to A4.

(B1) Image Information Acquisition

In the step B1, the image information is acquired by the moving object 20.

(B2) Image Information Transmission

In the step B2, the image information acquired by the moving object 20 is transmitted to the operation signal transmitter 10.

(B3) Image Information Reception

In the step B3, the operation signal transmitter 10 receives the image information transmitted from the moving object 20.

(B4) Image Information Display

In the step B4, the image information received by the operation signal transmitter 10 is displayed.

Fourth Example Embodiment

The fourth example embodiment relates to as aspect in which a predicted future position of the moving object is further displayed on the display unit. More specifically, the fourth example embodiment relates to an aspect in which the moving object operation system of the present invention further includes a position prediction unit and a position prediction step. The present example embodiment is the same as the third example embodiment unless otherwise stated, and reference can be made to the descriptions of the first, second, and third example embodiments.

Figure 11:
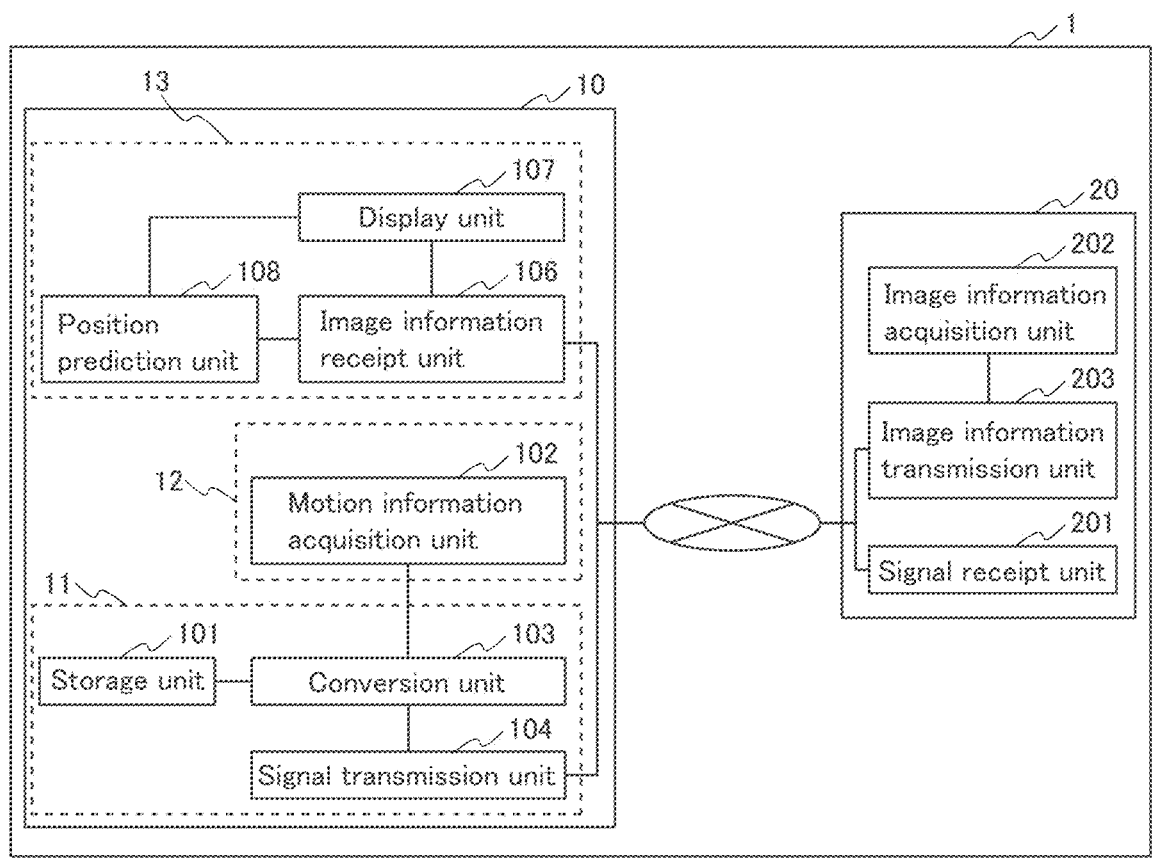
FIG. 11 is a block diagram showing an example of the moving object operation system according to the fourth example embodiment of the present invention.

FIG. 11 is a block diagram showing a moving object operation system according to the present example embodiment. As shown in FIG. 11, in the moving object operation system 1 of the present example embodiment, the operation signal transmitter 10 further includes a position prediction unit 108.

The operation signal transmitter 10 may be an operation signal transmission system, as described above. The operation signal transmission system 10 includes the main body 11 and two terminals 12 and 13 as described above. The position prediction unit 108 may further include, for example, a terminal 13 including the image information receipt unit 106 and the display unit 107.

The position prediction unit 108 predicts a future position of the moving object 20 based on the image information transmitted from the moving object 20, which is received by the image information receipt unit 106. The predicted position information obtained by the prediction may be, for example, position information after a predetermined period of time or position information over time. The position prediction unit 108 may be, for example, a CPU or the like.

The display unit 107 displays the received image information, and further displays a future position of the moving object 20 predicted by the position prediction unit 108. The display unit 107 may be, for example, a monitor for outputting images, and specific examples thereof include various image display apparatuses such as liquid crystal displays (LCDs), cathode ray tube (CRT) displays, and the like. The terminal 13 including the display unit 107 may be, for example, a human wearable display. Specifically, the terminal 13 including the display unit 107 may be, for example, a head mounted display or the like. When the display unit 107 is the wearable display, for example, the display unit 107 may also serve as the motion information acquisition unit 102.

Figure 12:
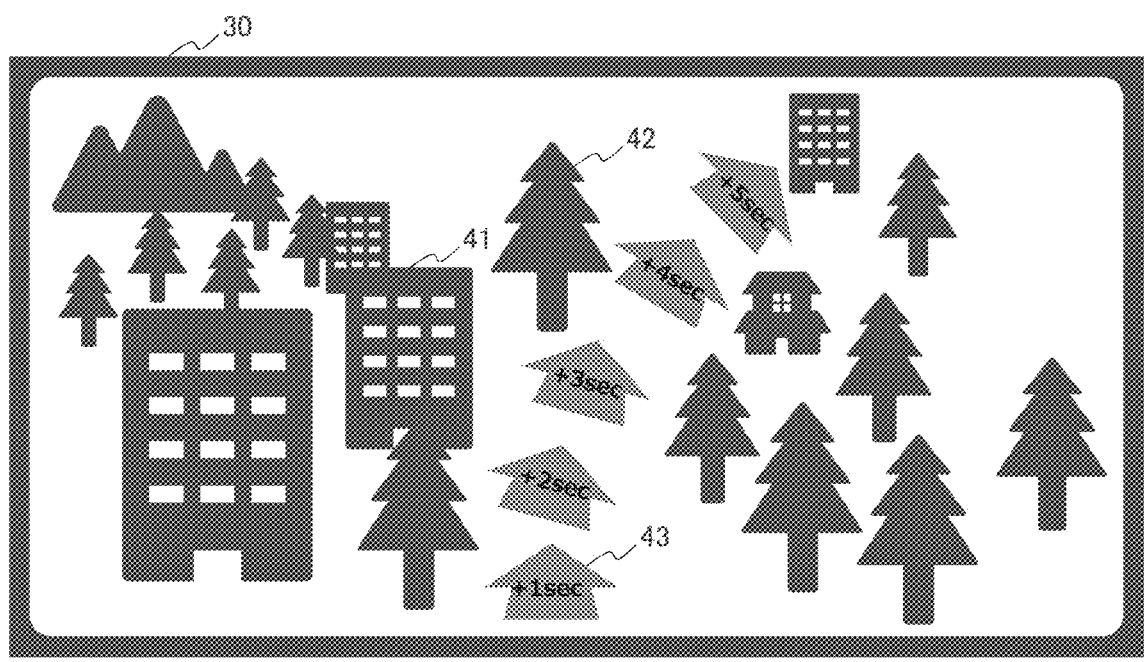
FIG. 12 is a schematic view showing an example of the display screen in the fourth example embodiment of the present invention.

FIG. 12 shows an example of the display screen of the display unit 107. FIG. 12 is merely for illustrative proposes and does not limit the present invention. As shown in FIG. 12, the display unit 107 displays buildings 41, trees 42, and the like as the image information received from the moving object 20 on the display screen 30. The display unit 107 further displays the predicted position information of the moving object 20 predicted by the position prediction unit 108. Specifically, as indicated by arrows 43 in FIG. 12, position information over time is displayed as the predicted position information. The arrows 43 indicate, for example, the position and the moving direction of the moving object 20 after a predetermined period of time. For example, as shown in FIG. 12, the predicted position information can indicate positions up to a predetermined period of time (e.g., after 5 seconds) in a predetermined period of time unit (e.g., every 1 second).

Figure 13:
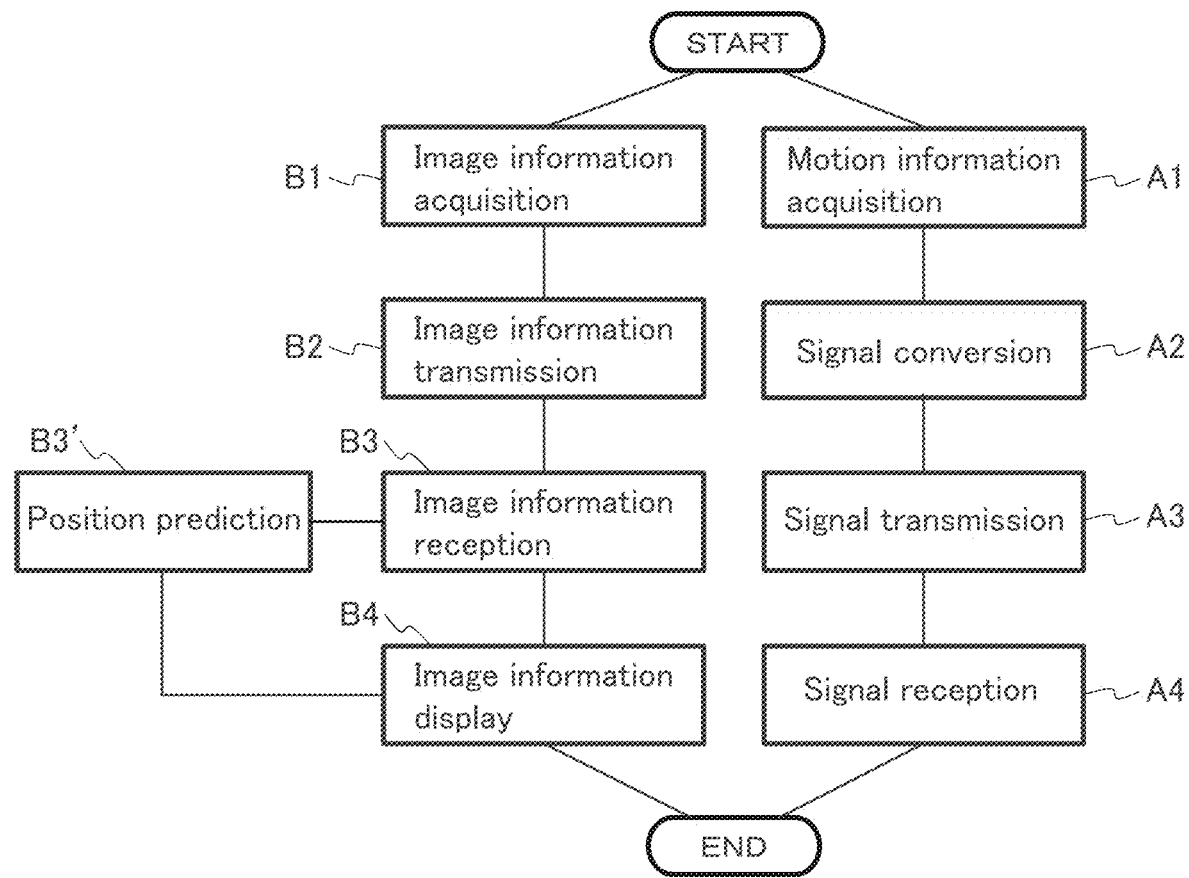
FIG. 13 is a flowchart showing an example of the moving object operation method according to the fourth example embodiment of the present invention.

FIG. 13 shows a flowchart of the moving object operation method according to the present example embodiment. The moving object operation method of the present example embodiment is performed as follows using, for example, the moving object operation system of FIG. 11. As shown in FIG. 13, the moving object operation method of the present example embodiment includes the step A1 (motion information acquisition), the step A2 (signal conversion), the step A3 (signal transmission), the step A4 (signal reception), the step B1 (image information acquisition), the step B2 (image information transmission), the step B3 (image information reception), a step B3' (position prediction), and the step B4 (image information display).

In the flowchart, the steps A1 to A4 are the same as in the example embodiments described above, and the steps B1 to B4 are performed in parallel.

(B1) Image Information Acquisition

In the step B1, the image information is acquired by the moving object 20.

(B2) Image Information Transmission

In the step B2, the image information acquired by the moving object 20 is transmitted to the operation signal transmitter 10.

(B3) Image Information Reception

In the step B3, the operation signal transmitter 10 receives the image information transmitted from the moving object 20.

(B3') Position Prediction

In the step B3', a future position of the moving object 20 is predicted based on the image information received by the operation signal transmitter 10.

(B4) Image Information Display

In the step B4, the image information received by the operation signal transmitter 10 and predicted position information are displayed.

Fifth Example Embodiment

The program according to the present example embodiment is a program that can execute the above-described moving object operation method on a computer. The program of the present example embodiment may be recorded on, for example, a computer-readable recording medium. The recording medium is not particularly limited, and examples thereof include random access memories (RAMs), read-only memories (ROMs), hard disks (HDs), optical disks, and Floppy® disks (FDs).

While the present invention has been described above with reference to illustrative example embodiments, the present invention is by no means limited thereto. Various changes and modifications that may become apparent to those skilled in the art may be made in the configuration and specifics of the present invention without departing from the scope of the present invention.

A part of or the whole of the above-described example embodiments can be described as the following supplementary notes. However, the present invention is by no means limited thereto.

(Supplementary Note 1)

A moving object operation system including:
 a moving object; and
 an operation signal transmitter for the moving object, wherein
 the moving object includes:
  a signal receipt unit that receives an operation signal from the operation signal transmitter,
 the operation signal transmitter includes:
  a storage unit that contains conversion information;
  a motion information acquisition unit that acquires motion information of an operator;
  a conversion unit that converts the acquired motion information into the operation signal to the moving object based on the conversion information; and
  a signal transmission unit that transmits the operation signal to the moving object,
 the conversion information includes human motion information and operation signal information for instructing the moving object in how to move, and the human motion information and the operation signal information are associated with each other, and
 the human motion information is motion information imagining movement of the moving object.

(Supplementary Note 2)

The moving object operation system according to supplementary note 1, wherein the human motion information is motion information for reproducing the movement of the moving object with a human body.

(Supplementary Note 3)

The moving object operation system according to supplementary note 1 or 2, wherein the moving object is a flight vehicle.

(Supplementary Note 4)

The moving object operation system according to supplementary note 3, wherein the flight vehicle is a drone.

(Supplementary Note 5)

The moving object operation system according to any one of supplementary notes 1 to 4, wherein
the human motion information includes a type of motion and a degree of motion,
the moving object movement information includes a type of movement and a degree of movement, and
the operation signal information includes a type of movement to be instructed and a degree of movement to be instructed.

(Supplementary Note 6)

The moving object operation system according to any one of supplementary notes 1 to 5, wherein
the operation signal transmitter further includes:
a sound information acquisition unit that acquires human sound information,
the conversion unit converts the acquired sound information into the operation signal to the moving object based on the conversion information, and
the conversion information further includes human sound information, and the sound information and the operation signal information are associated with each other.

(Supplementary Note 7)

The moving object operation system according to any one of supplementary notes 1 to 6, wherein
the moving object further includes:
an image information acquisition unit that acquires image information; and
an image information transmission unit that transmits the acquired image information to the operation signal transmitter, and
the operation signal transmitter further includes:
an image information receipt unit that receives the image information transmitted from the moving object; and
a display unit that displays the image information.

(Supplementary Note 8)

The moving object operation system according to supplementary note 7, wherein the image information acquisition unit of the moving object is a camera.

(Supplementary Note 9)

The moving object operation system according to supplementary note 7 or 8, wherein the display unit of the operation signal transmitter is a human wearable display.

(Supplementary Note 10)

The moving object operation system according to any one of supplementary notes 7 to 9, wherein
the operation signal transmitter further includes:
a position prediction unit that predicts a position of the moving object after a predetermined period of time based on the image information received by the image information receipt unit, and
the display unit displays the image information received by the image information receipt unit and the predicted position information obtained by the position prediction unit.

(Supplementary Note 11)

An operation signal transmission system for a moving object, including:
a storage unit that contains conversion information;
a motion information acquisition unit that acquires motion information of an operator;
a conversion unit that converts the acquired motion information into an operation signal to a moving object based on the conversion information; and
a signal transmission unit that transmits the operation signal to the moving object, wherein
the conversion information includes human motion information, moving object movement information, and operation signal information for instructing the moving object in how to move, and the human motion information, the moving object movement information, and the operation signal information are associated with one another, and
the human motion information is motion information imagining movement of the moving object.

(Supplementary Note 12)

The operation signal transmission system according to supplementary note 11, wherein the human motion information is motion information for reproducing the movement of the moving object with a human body.

(Supplementary Note 13)

The operation signal transmission system according to supplementary note 11 or 12, wherein the moving object is a flight vehicle.

(Supplementary Note 14)

The operation signal transmission system according to supplementary note 13, wherein the flight vehicle is a drone.

(Supplementary Note 15)

The operation signal transmission system according to any one of supplementary notes 11 to 14, wherein
the human motion information includes a type of motion and a degree of motion,
the moving object movement information includes a type of movement and a degree of movement, and
the operation signal information includes a type of movement to be instructed and a degree of movement to be instructed.

(Supplementary Note 16)

The operation signal transmission system according to any one of supplementary notes 11 to 15, further including:
a sound information acquisition unit that acquires human sound information, wherein
the conversion unit converts the acquired sound information into the operation signal to the moving object based on the conversion information, and
the conversion information further includes human sound information, and the sound information and the operation signal information are associated with each other.

(Supplementary Note 17)

The operation signal transmission system according to any one of supplementary notes 11 to 16, further including:
an image information receipt unit that receives the image information transmitted from the moving object; and
a display unit that displays the image information.

(Supplementary Note 18)

The operation signal transmission system according to supplementary note 17, wherein the display unit is a human wearable display.

(Supplementary Note 19)

The operation signal transmission system according to supplementary note 17 or 18, including:

an information acquisition terminal; and a server, wherein the terminal and the server are connectable via a communication network, the terminal includes:

the motion information acquisition unit, and the server includes:

the storage unit;

the conversion unit; and the signal transmission unit.

(Supplementary Note 20)

The operation signal transmission system according to supplementary note 19, wherein the information acquisition terminal further includes the sound information acquisition unit.

(Supplementary Note 21)

The operation signal transmission system according to supplementary note 19 or 20, further including:

a display terminal, wherein the display terminal includes:

the image information receipt unit; and the display unit.

(Supplementary Note 22)

The moving object operation system according to any one of supplementary notes 17 to 21, further including:

a position prediction unit that predicts a position of the moving object after a predetermined period of time based on the image information received by the image information receipt unit, wherein the display unit displays the image information received by the image information receipt unit and the predicted position information obtained by the position prediction unit.

(Supplementary Note 23)

A moving object operation method using a moving object and the operation signal transmission system according to any one of supplementary notes 11 to 22, including the steps of:

acquiring motion information of an operator by the system;

converting the acquired motion information into the operation signal to the moving object based on the conversion information by the system;

transmitting the operation signal to the moving object by the system; and receiving the transmitted operation signal by the moving object, wherein the conversion information includes human motion information and operation signal information for instructing the moving object in how to move, and the human motion information and the operation signal information are associated with each other, and the human motion information is motion information imagining movement of the moving object.

(Supplementary Note 24)

The method according to supplementary note 23, wherein the human motion information is motion information for reproducing the movement of the moving object with a human body.

(Supplementary Note 25)

The method according to supplementary note 23 or 24, wherein the moving object is a flight vehicle.

(Supplementary Note 26)

The method according to supplementary note 25, wherein the flight vehicle is a drone.

(Supplementary Note 27)

The method according to any one of supplementary notes 23 to 26, wherein the human motion information includes a type of motion and a degree of motion, the moving object movement information includes a type of movement and a degree of movement, and the operation signal information includes a type of movement to be instructed and a degree of movement to be instructed.

(Supplementary Note 28)

The method according to any one of supplementary notes 23 to 27, further including the step of:

acquiring human sound information by the system, wherein the acquired sound information is converted into the operation signal to the moving object based on the conversion information in the conversion step, and the conversion information further includes human sound information, and the sound information and the operation signal information are associated with each other.

(Supplementary Note 29)

The method according to any one of supplementary notes 23 to 28, further including the steps of:

acquiring image information by the moving object;

transmitting the acquired image information to the system by the moving object;

receiving the image information transmitted from the moving object by the system; and displaying the image information by the system.

(Supplementary Note 30)

The method according to supplementary note 29, wherein image information is acquired by a camera in the image information acquisition step.

(Supplementary Note 31)

The method according to supplementary note 29 or 30, wherein the image information is displayed on a human wearable display in the display step.

(Supplementary Note 32)

The method according to any one of supplementary notes 29 to 31, further including the step of:

predicting a position of the moving object after a predetermined period of time based on the image information received in the image information receipt step by the system, wherein the image information received in the image information receipt step and the predicted position information obtained in the position prediction step are displayed in the display step.

(Supplementary Note 33)

A program that can execute the moving object operation method according to any one of supplementary notes 23 to 32 on a computer.

(Supplementary Note 34)

A computer-readable recording medium recorded with the program according to supplementary note 33.

This application claims priority from Japanese Patent Application No. 2016-150569 filed on Jul. 29, 2016. The entire subject matter of the Japanese Patent Application is incorporated herein by reference.

INDUSTRIAL APPLICABILITY

According to the present invention, an easier operation of a moving object can be achieved.

REFERENCE SIGNS LIST 1 moving object operation system
10 operation signal transmitter
20 moving object
11 main body
12, 13 terminal
101 storage unit
102 motion information acquisition unit
103 conversion unit
104 signal transmission unit
105 sound information acquisition unit
106 image information receipt unit
107 display unit
108 position prediction unit
201 signal receipt unit
202 image information acquisition unit
203 image information transmission unit
30 display screen
41 building
42 tree

What is claimed is:

1. A moving object operation system comprising:
a moving object; and
an operation signal transmitter for the moving object, wherein
the moving object comprises:
a processor; and
a memory storing executable instructions that, when executed by the processor, causes the processor to perform as:
  a signal receipt unit that receives an operation signal from the operation signal transmitter,
the operation signal transmitter comprises:
a processor; and
a memory storing executable instructions that, when executed by the processor, causes the processor to perform as:
  a storage unit that contains conversion information;
  a motion information acquisition unit that acquires motion information of an operator;
  a conversion unit that converts the acquired motion information into the operation signal to the moving object based on the conversion information; and
  a signal transmission unit that transmits the operation signal to the moving object,
the conversion information includes human motion information and operation signal information for instructing the moving object in how to move, and the human motion information and the operation signal information are associated with each other, and
the human motion information is motion information imagining movement of the moving object,
wherein in the conversion information, the human motion information and the operation signal information are associated with each other by at least one combination selected from the group consisting of the following (i) to (iii):

(i) when the human motion information is an upright posture facing the front, the operation signal information instructs the moving object to stand still, when the human motion information is a posture of tilting the upper body forward, the operation signal information instructs the moving object to move straight ahead, when the human motion information is a posture of twisting the body to the right, the operation signal information instructs the moving object to turn right, and when the human motion information is a posture of twisting the body to the left, the operation signal information instructs the moving object to turn left;

(ii) when the human motion information is a body posture of bending the right arm, the operation signal information instructs the moving object to move right in parallel, and when the human motion information is a body posture of bending the left arm, the operation signal information instructs the moving object to move left in parallel; and (iii) when the human motion information is an upright posture facing upward with palms down, the operation signal information instructs the moving object to take off.

2. The moving object operation system according to claim 1, wherein the human motion information is motion information for reproducing the movement of the moving object with a human body.

3. The moving object operation system according to claim 1, wherein the moving object is a flight vehicle.

4. The moving object operation system according to claim 3, wherein the flight vehicle is a drone.

5. The moving object operation system according to claim 1, wherein
the human motion information includes a type of motion and a degree of motion,
the moving object movement information includes a type of movement and a degree of movement, and
the operation signal information includes a type of movement to be instructed and a degree of movement to be instructed.

6. The moving object operation system according to claim 1, wherein
the operation signal transmitter processor further performs as
a sound information acquisition unit that acquires human sound information,
the conversion unit converts the acquired sound information into the operation signal to the moving object based on the conversion information, and
the conversion information further includes human sound information, and the sound information and the operation signal information are associated with each other.

7. The moving object operation system according to claim 1, wherein
the moving object processor further performs as:
an image information acquisition unit that acquires image information; and
an image information transmission unit that transmits the acquired image information to the operation signal transmitter, and
the operation signal transmitter processor further performs as:
an image information receipt unit that receives the image information transmitted from the moving object; and
a display unit that displays the image information.

8. The moving object operation system according to claim 7, wherein the image information acquisition unit of the moving object is a camera.

9. The moving object operation system according to claim 7, wherein the display unit of the operation signal transmitter is a human wearable display.

10. The moving object operation system according to claim 7, wherein
the operation signal transmitter processor further performs as:
a position prediction unit that predicts a position of the moving object after a predetermined period of time based on the image information received by the image information receipt unit, and
the display unit displays the image information received by the image information receipt unit and the predicted position information obtained by the position prediction unit.

11. An operation signal transmission system for a moving object, comprising:
a processor; and
a memory storing executable instructions that, when executed by the processor, causes the processor to perform as:
a storage unit that contains conversion information;
a motion information acquisition unit that acquires motion information of an operator;
a conversion unit that converts the acquired motion information into an operation signal to a moving object based on the conversion information; and
a signal transmission unit that transmits the operation signal to the moving object, wherein
the conversion information includes human motion information, moving object movement information, and operation signal information for instructing the moving object in how to move, and the human motion information, the moving object movement information, and the operation signal information are associated with one another, and
the human motion information is motion information imagining movement of the moving object,
wherein in the conversion information, the human motion information and the operation signal information are associated with each other by at least one combination selected from the group consisting of the following (i) to (iii):
(i) when the human motion information is an upright posture facing the front, the operation signal information instructs the moving object to stand still, when the human motion information is a posture of tilting the upper body forward, the operation signal information instructs the moving object to move straight ahead, when the human motion information is a posture of twisting the body to the right, the operation signal information instructs the moving object to turn right, and when the human motion information is a posture of twisting the body to the left, the operation signal information instructs the moving object to turn left;
(ii) when the human motion information is a body posture of bending the right arm, the operation signal information instructs the moving object to move right in parallel, and when the human motion information is a body posture of bending the left arm, the operation signal information instructs the moving object to move left in parallel; and
(iii) when the human motion information is an upright posture facing upward with palms down, the operation signal information instructs the moving object to take off.

12. The operation signal transmission system according to claim 11, wherein the human motion information is motion information for reproducing the movement of the moving object with a human body.

13. The operation signal transmission system according to claim 11, wherein the moving object is a flight vehicle.

14. The operation signal transmission system according to claim 13, wherein the flight vehicle is a drone.

15. The operation signal transmission system according to claim 11, wherein
the human motion information includes a type of motion and a degree of motion,
the moving object movement information includes a type of movement and a degree of movement, and
the operation signal information includes a type of movement to be instructed and a degree of movement to be instructed.

16. The operation signal transmission system according to claim 11, wherein the processor further performs as:
a sound information acquisition unit that acquires human sound information, wherein
the conversion unit converts the acquired sound information into the operation signal to the moving object based on the conversion information, and
the conversion information further includes human sound information, and the sound information and the operation signal information are associated with each other.

17. The operation signal transmission system according to claim 11, wherein the processor further performs as:
an image information receipt unit that receives the image information transmitted from the moving object; and
a display unit that displays the image information.

18. The operation signal transmission system according to claim 17, wherein the display unit is a human wearable display.

19. A moving object operation method using a moving object and an operation signal transmission system, comprising:
acquiring motion information of an operator by the system;
converting the acquired motion information into the operation signal to the moving object based on the conversion information by the system;
transmitting the operation signal to the moving object by the system; and
receiving the transmitted operation signal by the moving object, wherein
the conversion information includes human motion information and operation signal information for instructing the moving object in how to move, and the human motion information and the operation signal information are associated with each other, and
the human motion information is motion information imagining movement of the moving object,
wherein in the conversion information, the human motion information and the operation signal information are associated with each other by at least one combination selected from the group consisting of the following (i) to (iii):
(i) when the human motion information is an upright posture facing the front, the operation signal information instructs the moving object to stand still, when the human motion information is a posture of tilting the upper body forward, the operation signal information instructs the moving object to move straight ahead, when the human motion information is a posture of twisting the body to the right, the operation signal information instructs the moving object to turn right, and when the human motion information is a posture of twisting the body to the left, the operation signal information instructs the moving object to turn left;

(ii) when the human motion information is a body posture of bending the right arm, the operation signal information instructs the moving object to move right in parallel, and when the human motion information is a body posture of bending the left arm, the operation signal information instructs the moving object to move left in parallel; and (iii) when the human motion information is an upright posture facing upward with palms down, the operation signal information instructs the moving object to take off.

20. A non-transitory computer-readable recording medium recorded with a program that can execute a moving object operation method using a moving object and an operation signal transmission system, said execution comprising:

acquiring motion information of an operator by the system;

converting the acquired motion information into the operation signal to the moving object based on the conversion information by the system;

transmitting the operation signal to the moving object by the system; and receiving the transmitted operation signal by the moving object, wherein the conversion information includes human motion information and operation signal information for instructing the moving object in how to move, and the human motion information and the operation signal information are associated with each other, and the human motion information is motion information imagining movement of the moving object, wherein in the conversion information, the human motion information and the operation signal information are associated with each other by at least one combination selected from the group consisting of the following (i) to (iii):

(i) when the human motion information is an upright posture facing the front, the operation signal information instructs the moving object to stand still, when the human motion information is a posture of tilting the upper body forward, the operation signal information instructs the moving object to move straight ahead, when the human motion information is a posture of twisting the body to the right, the operation signal information instructs the moving object to turn right, and when the human motion information is a posture of twisting the body to the left, the operation signal information instructs the moving object to turn left;

(ii) when the human motion information is a body posture of bending the right arm, the operation signal information instructs the moving object to move right in parallel, and when the human motion information is a body posture of bending the left arm, the operation signal information instructs the moving object to move left in parallel; and (iii) when the human motion information is an upright posture facing upward with palms down, the operation signal information instructs the moving object to take off.

* * * * *